(12) United States Patent
Pfund

(10) Patent No.: US 10,945,325 B2
(45) Date of Patent: Mar. 9, 2021

(54) COLOR TUNABLE LUMINAIRES FOR OFFICES WITH CHANGEABLE AMBIENT LIGHT CONDITIONS

(71) Applicant: SYLVAN R. SHEMTIZ DESIGNS, INC., West Haven, CT (US)

(72) Inventor: David R. Pfund, Woodbridge, CT (US)

(73) Assignee: SYLVAN R. SHEMITZ DESIGNS, INC., West Haven, CT (US)

(*) Notice: Subject to any disclaimer, the term of this patent is extended or adjusted under 35 U.S.C. 154(b) by 0 days.

(21) Appl. No.: 15/983,202

(22) Filed: May 18, 2018

(65) Prior Publication Data
US 2018/0338368 A1  Nov. 22, 2018

Related U.S. Application Data

(60) Provisional application No. 62/508,571, filed on May 19, 2017.

(51) Int. Cl.
H05B 47/11 (2020.01)
H05B 45/20 (2020.01)

(52) U.S. Cl.
CPC ............ *H05B 47/11* (2020.01); *H05B 45/20* (2020.01)

(58) Field of Classification Search
None
See application file for complete search history.

(56) References Cited

U.S. PATENT DOCUMENTS

| | | | |
|---|---|---|---|
| 2015/0181679 A1* | 6/2015 | Liao | H05B 37/0027 315/291 |
| 2018/0077770 A1* | 3/2018 | Sooch | H05B 33/0872 |
| 2018/0077783 A1* | 3/2018 | Sooch | H05B 33/0863 |

* cited by examiner

Primary Examiner — Jany Richardson
(74) Attorney, Agent, or Firm — Cantor Colburn LLP (57) ABSTRACT

A luminaire for a workstation, including a tunable light source, a control circuit in association with the luminaire configured to automatically modulate a spectral power distribution of the tunable light source in a response to a changeable ambient lighting condition and an operator interface in communication with the control circuit, where the operator interface is configured to allow a workstation occupant to activate and deactivate the response.

7 Claims, 8 Drawing Sheets

FIG. 8

COLOR TUNABLE LUMINAIRES FOR OFFICES WITH CHANGEABLE AMBIENT LIGHT CONDITIONS

CROSS REFERENCE TO RELATED APPLICATION

This application is related to and claims the benefit of U.S. Provisional Patent Application Ser. No. 62/508,571 filed on May 19, 2017, the contents of which are herein incorporated by reference in their entirety.

TECHNICAL FIELD

The disclosure relates to a luminaire with a color tunable light source. More particularly, the disclosure relates to a workstation luminaire or portion thereof with a user interface and operating in an ambient light condition whereby said user interface allows an operator to selectively modulate the color of the luminaire light output and, alternatively, associate the color of the luminaire light output with the color of the ambient light condition such that the color of the luminaire light output automatically changes in response to changes in the color of the ambient light condition.

BACKGROUND

In an effort to reduce office energy consumption and/or to satisfy the varying needs and preferences of workers performing variety of visual tasks, said visual tasks having a range of illuminance requirements, office lighting systems often comprise a combination of personal, individually controlled workstation luminaires or task lights in addition to an overall system of electric and/or daylight-based ambient lighting. Moreover, the diurnal changes in the spectral power distribution of natural daylight are known to have positive effects on human health, mood, and well-being. This compels designers to design office spaces with an increased exposure to natural daylight and to deploy electric general lighting systems with dynamic spectral power and/or color temperature characteristics that vary automatically according to the time of day. Likewise, supplemental user-controlled task lights may be provided that allow individuals to vary the spectral power and/or color temperature characteristics of said task lights according to their personal preference and/or needs.

In offices where daylight is prevalent and/or the spectral characteristics of electric ambient lighting varies according to the time of day or otherwise, a discrepancy can occur between the color appearance of the general ambient lighting and the color appearance of any given task light as determined by each workstation occupant. Moreover, occupant preference for task light color can vary according to the ambient lighting condition such that occupants may feel compelled to modulate the color appearance of their workstation task lighting as the color appearance of the ambient lighting varies. The need to constantly adjust personal task lighting to maintain a preferred correlation between workstation task light color appearance and the color appearance of a changeable general ambient condition can lead to employee dissatisfaction with their workplace environment, and ultimately have a negative effect on business outcomes. Accordingly, it is desirable that workstation luminaires with color tunable light sources and operating in an ambient light condition be configured to respond to changes in the spectral power and/or color temperature characteristics of said ambient light condition. It is further desirable that these luminaires be configured with a user interface that allows an operator to modulate the color appearance of each workstation task light according to personal preference.

BRIEF SUMMARY

A luminaire for office workstations is provided herein including a tunable light source, a control circuit in association with the luminaire configured to automatically modulate a spectral power distribution of the tunable light source in a response to a changeable ambient lighting condition and an operator interface in communication with the control circuit, where the operator interface is configured to allow a workstation occupant to activate and deactivate the response.

BRIEF DESCRIPTION OF THE DRAWINGS

Referring to the exemplary drawings wherein like elements are numbered alike in the several FIGS..

DETAILED DESCRIPTION OF THE PREFERRED EMBODIMENTS

Figure 1:
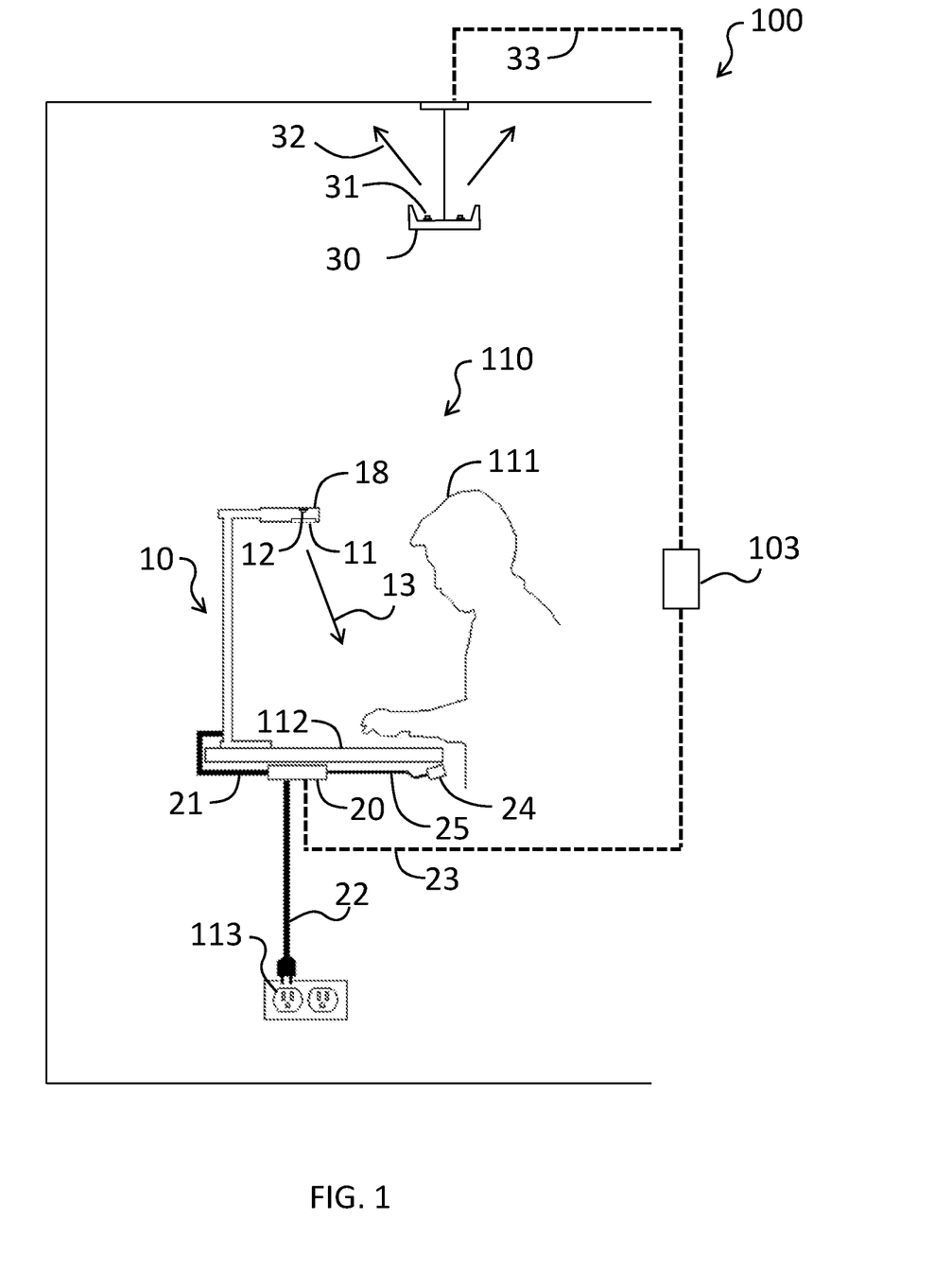
FIG. 1 is a diagram of an office comprising an exemplary embodiment of a luminaire of the invention.

FIG. 1 discloses an office 100 with workstation 110, ambient luminaire 30 comprising one or more color tunable light source(s) 31 providing ambient lighting 32 and associated with controller 103, said controller 103 configured to manually or automatically modulate the spectral power and/or color temperature characteristics of said ambient lighting 32 via said light source(s) 31. Controller 103 may be located in office 100 or in a remote location and may communicate with luminaire 30 wirelessly or via a communication cable 33.

Referring to FIG. 1, in a preferred embodiment, portable luminaire 10 is deployed in workstation 110, said luminaire 10 comprising a color tunable light source 12 disposed in or on luminaire body 18, a control circuit 20 associated with tunable light source 12 via control cable 21, electrical cord and plug 22 associated with a power receptacle 113 of workstation 110, and an operator interface 24. In this preferred embodiment, control circuit 20 of luminaire 10 is disposed at the underside of work surface 112 of workstation 110, and operator interface 24 of luminaire 10 is disposed at work surface 112 in a position easily accessible to workstation occupant 111; however, it is also conceived that control circuit 20 and/or operator interface 24 may be disposed within or on luminaire body 18 along with tunable light source 12.

Referring again to FIG. 1, control circuit 20 is in communication with operator interface 24 and controller 103 via interface cable 25 and communication cable 23, respectively; where any or all of control cable 21, cord and plug 22, communication cable 23, and/or interface cable 25 may be associated with control circuit 20 via one or more pluggable quick-connect/quick-disconnect port(s). Alternatively, it is also conceived that control circuit 20 may communicate wirelessly with operator interface 24 and/or controller 103. Furthermore, operator interface 24 comprises one or more user interfaces (e.g. touch pads, pushbuttons, dials, sliders, and the like) that allow workstation occupant 111 to modulate tunable light source 12 via interface cable 25, controller 20, and control cable 21 to achieve preferred spectral power and/or color temperature characteristics for task lighting 13.

Furthermore, and in accordance with the present invention, control circuit 20 is configured with a control program whereby tunable light source 12 is modulated via control cable 21 in response to signals received from controller 103 such that the color characteristics of task lighting 13 produced by tunable light source 12 is in correlation with ambient lighting 32, and, operator interface 24 is comprised with one or more user interfaces that allow workstation occupant 111 to activate and deactivate said control program.

Figure 2:
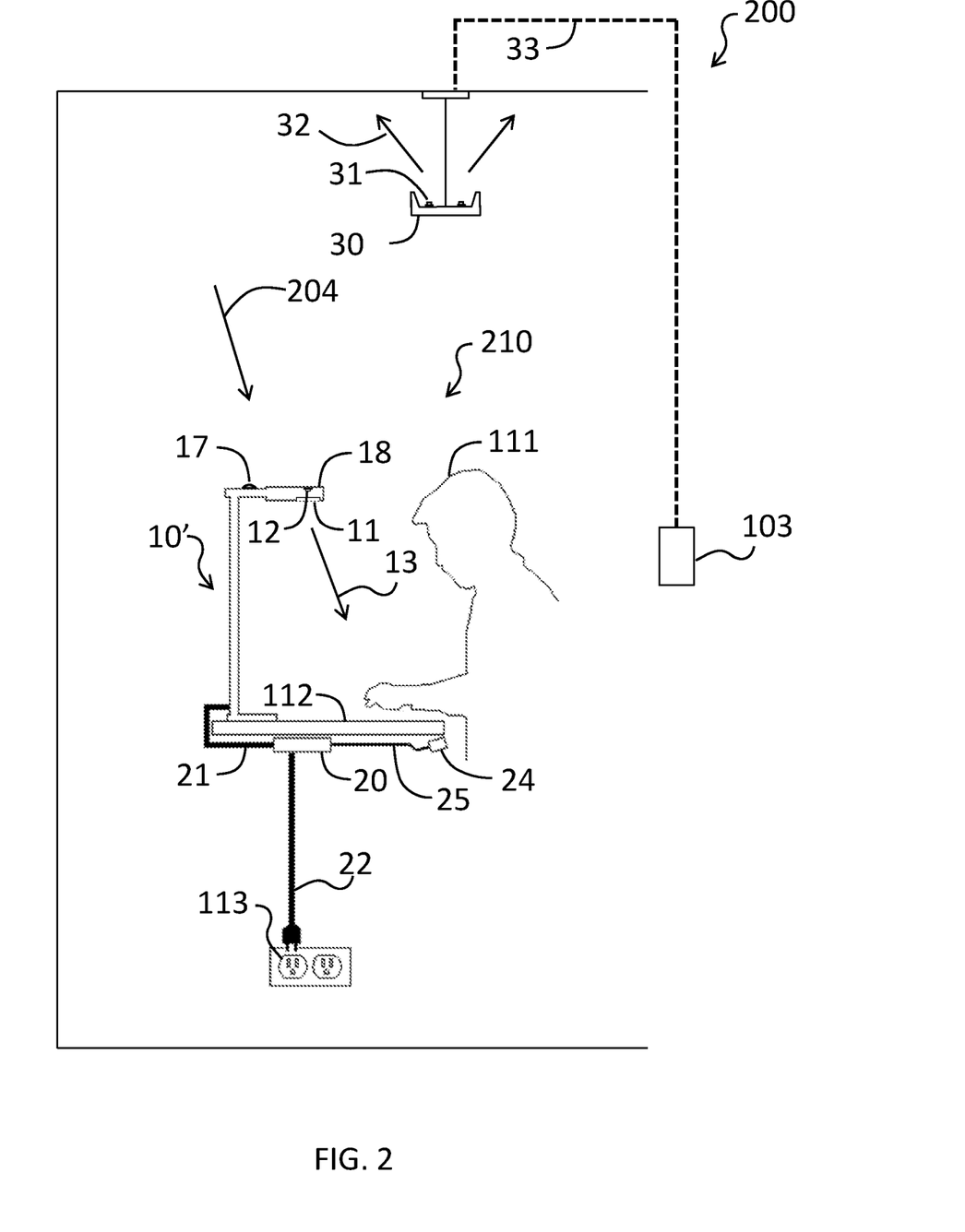
FIG. 2 is a diagram of an office comprising another exemplary embodiment of a luminaire of the invention.

Referring now to FIG. 2, in another preferred embodiment, where many of the items disclosed in office 100, workstation 110, and luminaire 10 of FIG. 1 are deployed in office 200, workstation 210, and luminaire 10' disposed therein, and where ambient light 32 results in ambient light condition 204 at luminaire 10' of workstation 210, luminaire 10' further comprises an ambient light sensor 17 capable of sensing the spectral power and/or color temperature characteristics of ambient light condition 204, said ambient light sensor being in communication with control circuit 20 of luminaire 10' via control cable 21. The operation and advantages of this preferred embodiment are identical to the advantages and operation of the embodiment disclosed in FIG. 1 except that tunable light source 12 is modulated in correlation with ambient lighting 32 in response to signals received by control circuit 20 from ambient light sensor 17 instead of signals received from controller 103.

Figure 3:
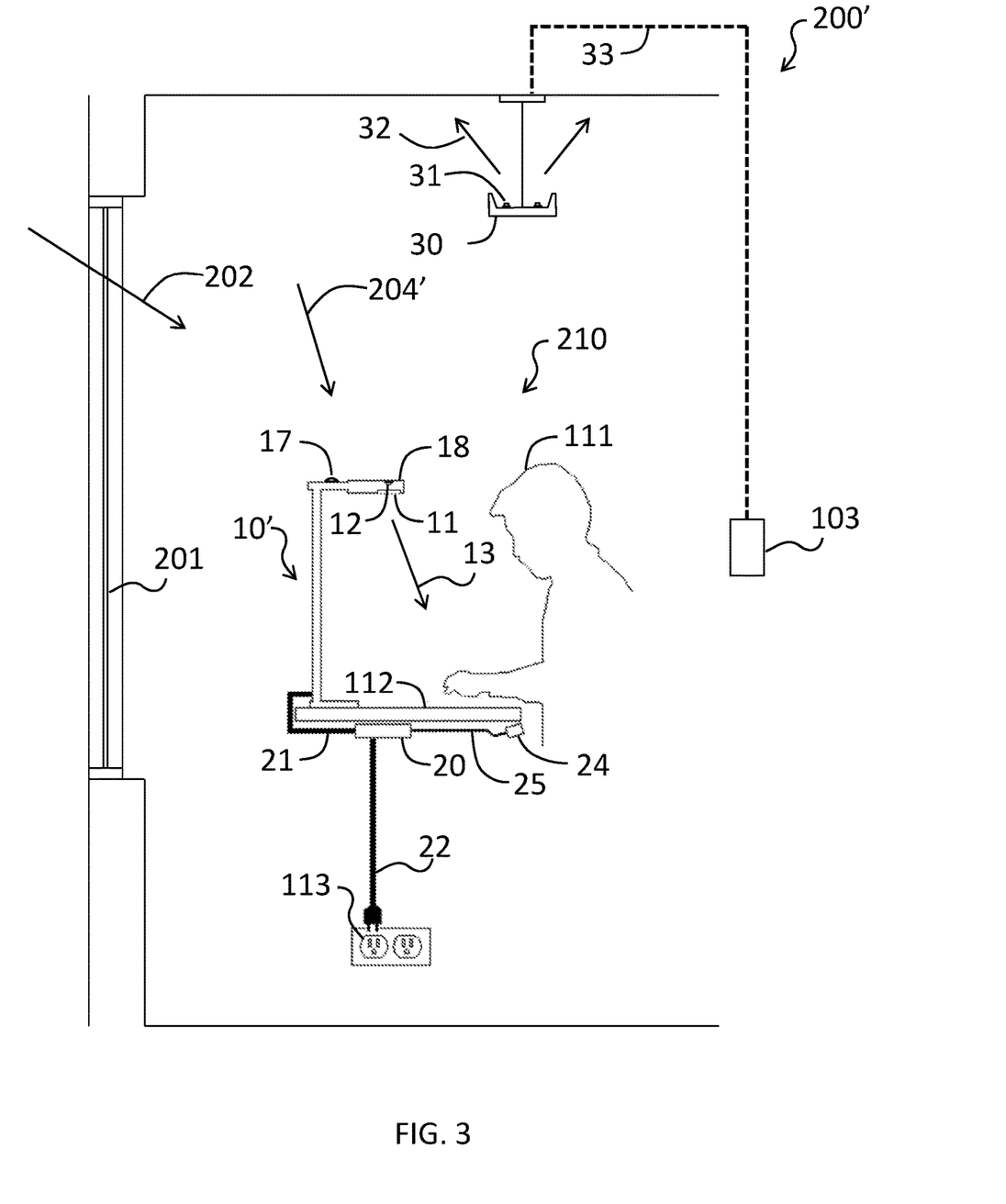
FIG. 3 is a diagram of another office comprising the luminaire of the invention disclosed in FIG. 2.

A further advantage of this preferred embodiment is illustrated in FIG. 3, where many of the items disclosed in office 200 of FIG. 2 are deployed in office 200' which is further comprised with exterior window 201 allowing daylight 202 to enter office 200 and combine with ambient light 32 resulting in ambient light condition 204' at luminaire 10' of workstation 210. Accordingly, the user may activate the previously disclosed control program of control circuit 20 via operator interface 24 to desirably cause task lighting 13 to automatically modulate in correlation to the color characteristics of the resultant ambient light condition 204' as communicated to control circuit 20 via ambient light sensor 17 and control cable 21.

Figure 4:
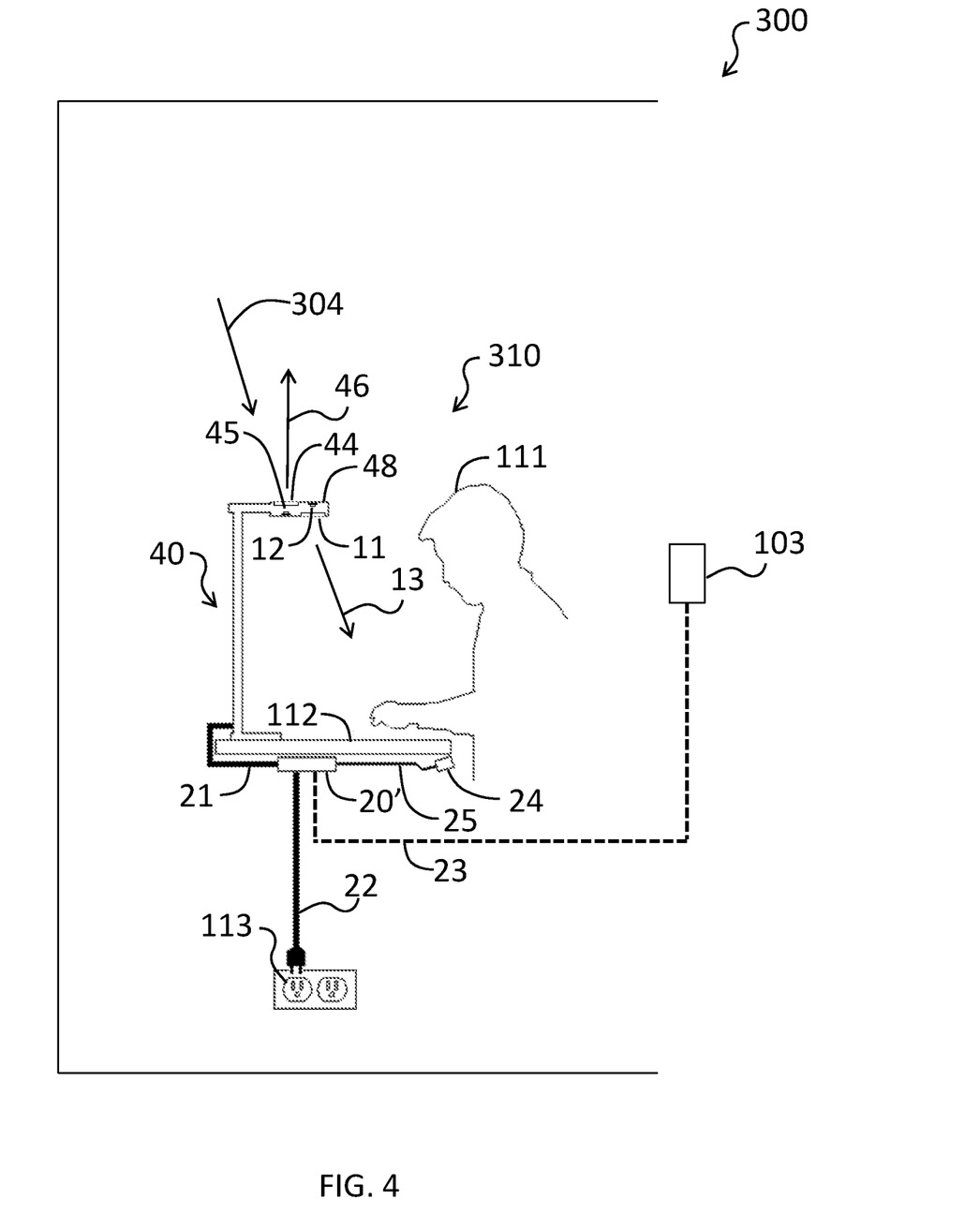
FIG. 4 is a diagram of an office comprising another exemplary embodiment of a luminaire of the invention.

Referring now to FIG. 4, in another preferred embodiment, where many of the items disclosed in office 100, workstation 110, and luminaire 10 of FIG. 1 are deployed in office 300, workstation 310, and luminaire 40 disposed therein, luminaire 40 is a combination task/ambient luminaire further comprising a tunable light source 45 disposed in or on luminaire body 48 and control circuit 20' associated with tunable light sources 12 and 45 via control cable 21, associated with operator interface 24 via interface cable 25 and powered via electrical cord and plug 22 associated with a power receptacle 113 of workstation 300. Specifically, tunable light source 45 is oriented to provide indirect ambient lighting 46 resulting in ambient light condition 304 at luminaire 40. In this preferred embodiment, control circuit 20' of luminaire 40 is disposed at the underside of work surface 112 of workstation 310, and operator interface 24 of luminaire 40 is disposed at work surface 112 in a position easily accessible to workstation occupant 111; however, it is also conceived that control circuit 20' and/or operator interface 24 may be disposed within or on luminaire body 48 along with tunable light sources 12 and 45. It is further conceived that any or all of control cable 21, cord and plug 22, communication cable 23, and/or interface cable 25 may be associated with controller 20' via one or more pluggable quick-connect/quick-disconnect port(s). Alternatively, it is also conceived that controller 20' may communicate wirelessly with operator interface 24 and/or controller 103.

Referring again to FIG. 4, control circuit 20' is in communication with controller 103 via communication cable 23, said controller 103 configured to manually or automatically modulate the spectral power and/or color temperature characteristics of ambient lighting condition 304 via said control circuit 20', said light source 45, and associated ambient lighting 46. Additionally, and as previously disclosed, operator interface 24 comprises one or more user interfaces (e.g. touch pads, pushbuttons, dials, sliders, and the like) that allow workstation occupant 111 to modulate tunable light source 12 via interface cable 25, controller 20', and control cable 21 to achieve preferred spectral power and/or color temperature characteristics for task lighting 13.

Furthermore, and in accordance with the present invention, control circuit 20' of luminaire 40 is configured with a control program whereby tunable light source 12 is modulated via control cable 21 in response to signals received from controller 103 such that the color characteristics of task lighting 13 produced by tunable light source 12 is in correlation with ambient lighting condition 304, and, as previously disclosed, operator interface 24 is comprised with one or more user interfaces that allow workstation occupant 111 to activate and deactivate said control program.

It is further conceived that controller 103 may be integrated into control circuit 20' of luminaire 40 and may include a configurable, astronomical time processor capable of discerning and/or storing the geo-position of the luminaire based on user input or GPS thus allowing said control circuit to modulate the spectral distribution and/or color temperature of the task light 13 and/or ambient condition 304 according to the local astronomical time of day and time of year.

Figure 5:
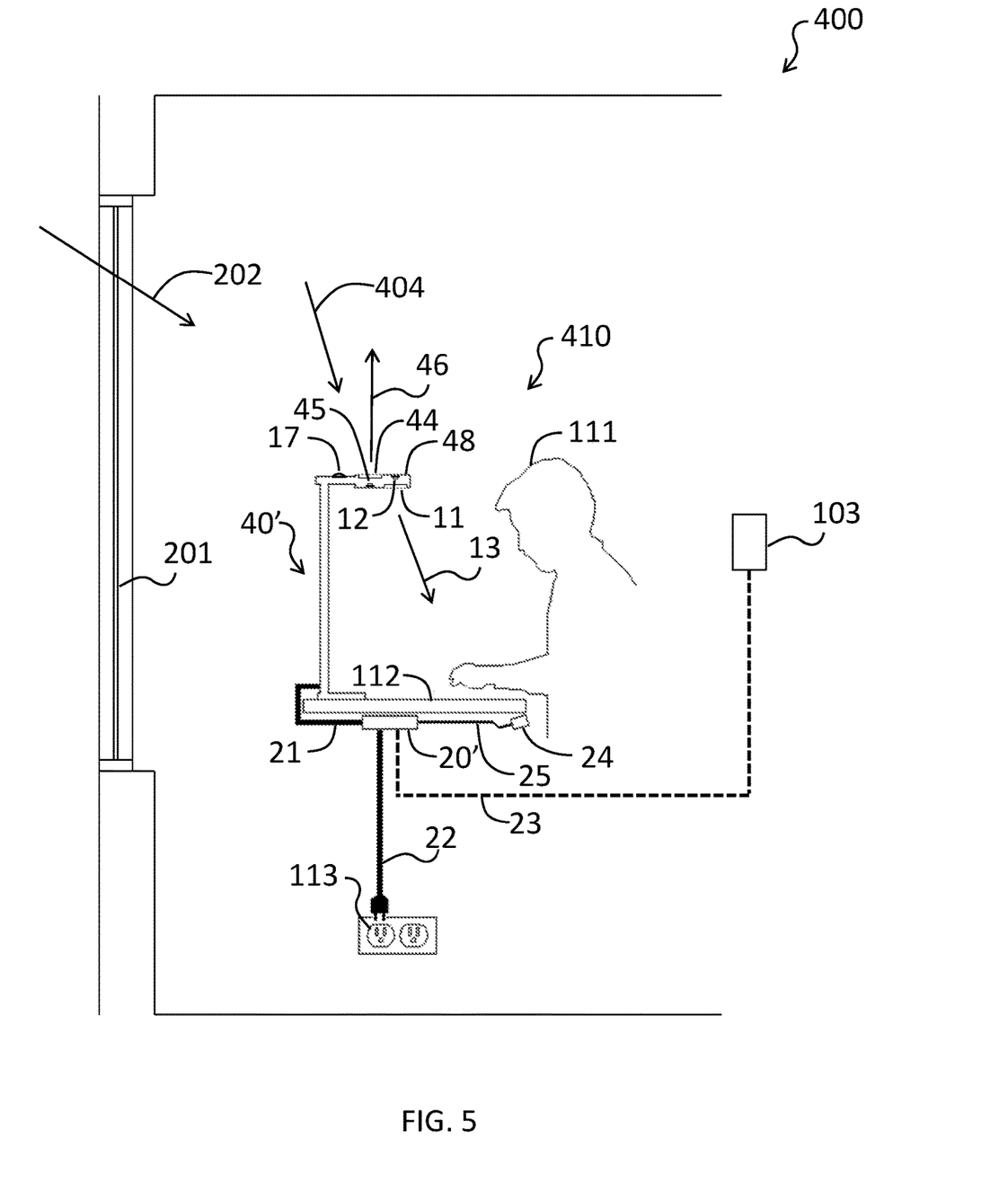
FIG. 5 is a diagram of an office comprising another exemplary embodiment of a luminaire of the invention.

Referring now to FIG. 5, in another preferred embodiment, where many of the items disclosed in office 200', workstation 210, and luminaire 10' of FIG. 3 and many of the items disclosed in office 300, workstation 310, and luminaire 40 of FIG. 4 are deployed in office 400, workstation 410, and luminaire 40' disposed therein, and where ambient light 46 and daylight 202 combine and together result in ambient light condition 404 at luminaire 40', control circuit 20' is further associated with light sensor 17 via control cable 21.

The operation and advantages of this preferred embodiment are identical to the advantages and operation of the embodiment disclosed in FIG. 3 such that the user may activate the previously disclosed control program of control circuit 20' via operator interface 24 to desirably cause task lighting 13 to automatically modulate in correlation to the color characteristics of the resultant ambient light condition 404 at luminaire 40' as communicated to control circuit 20' via ambient light sensor 17 and control cable 21.

In the embodiments of FIGS. 4-5, the controller 103 is illustrated as being disposed remotely from the luminaire 40 and connected thereto via cabling 21, 23 or by a wireless connection. As noted above, the controller 103 may, in other embodiments, be integrated into the control circuit 20'. Still further, in other embodiments, the controller 103 may be disposed integrally with the luminaire 40. For example, the controller 103 may be disposed on an exterior surface of the luminaire 40 or incorporated into an interior of the luminaire 40. Similar integral dispositions of the controller 103 may occur in other embodiments such as those illustrated in FIGS. 1-3 and 7 and others discussed herein.

The controller 103 may further comprise a sensor for detecting the spectral power and/or color temperature characteristics of an ambient light condition within the various rooms 100, 200, 200', 300, 400, 500 described herein. The sensor of the controller 103 may be the sensor 17 described herein and/or an independent sensing mechanism.

Figure 6:
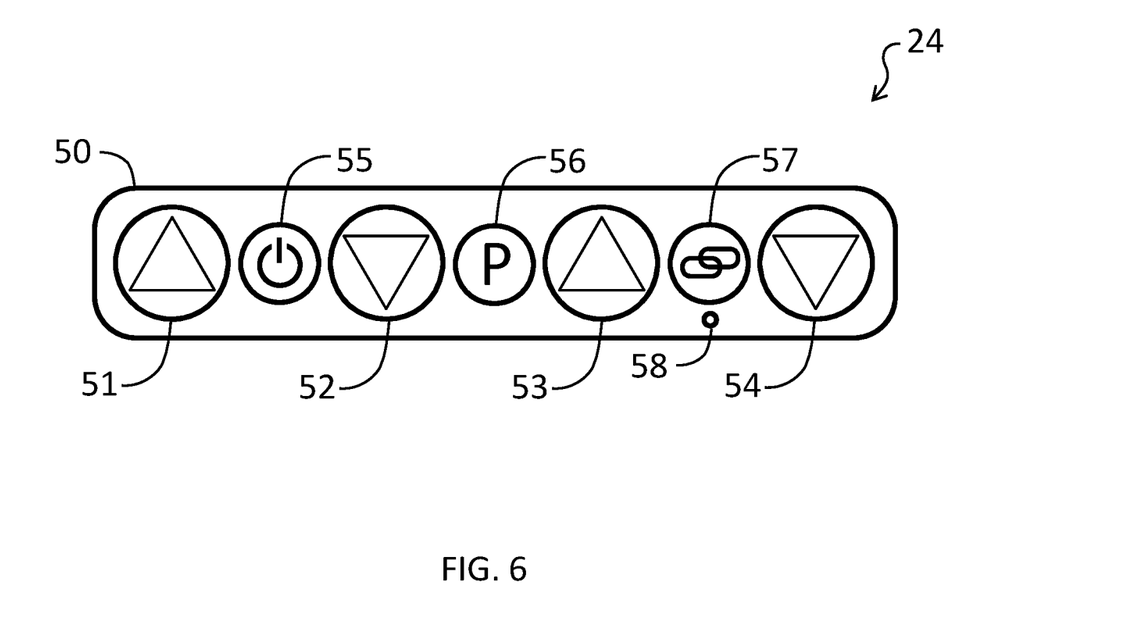
FIG. 6 is a frontal view of the user interface of the luminaires of the invention disclosed in FIGS. 1-5.

Referring once more to the preferred embodiments disclosed in FIGS. 1-5, operator interface 24 may comprise a variety of additional user interfaces, and control circuits 20 and 20' may be further configured accordingly, to allow workstation occupant 111 to switch tunable light source 12 "on" and "off", to vary the lumen output of tunable light source 12 at any given color temperature setting in order to increase or decrease task light 13, and/or to save and recall desirable intensity and color characteristics of tunable light source 12 as defined by workstation occupant 111 using the various user interfaces of operator interface 24. Accordingly, FIG. 6 discloses a preferred user interface 24 comprising an interface housing 50, pushbuttons 51, 52, 53, 54, 55, 56 and 57, and indicator LED 58. Specifically, pushbutton 55 is configured along with control circuit 20 or 20' to switch tunable light source 12 "on" and "of" pushbuttons 53 and 54 are configured along with control circuit 20 or 20' to respectively increase and decrease the color temperature of tunable light source 12, pushbuttons 51 and 52 are configured along with control circuit 20 or 20' to respectively increase and decrease the lumen output of tunable light source 12 at any given color temperature setting, and pushbutton 57 is configured along with control circuit 20 or 20' to activate and deactivate a control program of control circuit 20 or 20', said control program configured to desirably modulate task lighting 13 in correlation to the color characteristics of a known ambient light condition at the luminaire. Operator interface 24 is further configured along with control circuit 20 or 20' such that indicator LED 58 is illuminated when said control program of control circuit 20 or 20' is active, and such that LED 58 is not illuminated when said control program of control circuit 20 or 20' is not active. Furthermore, pushbutton 56 is configured along with control circuit 20 or 20' to save and recall a desirable intensity setting for tunable light source 12 as selected using pushbuttons 51 and 52, along with the desirable state of said control program, and, if said desirable program state is "inactive," then also a desirable color setting for tunable light source 12 as selected using pushbuttons 53 and 54.

Figure 7:
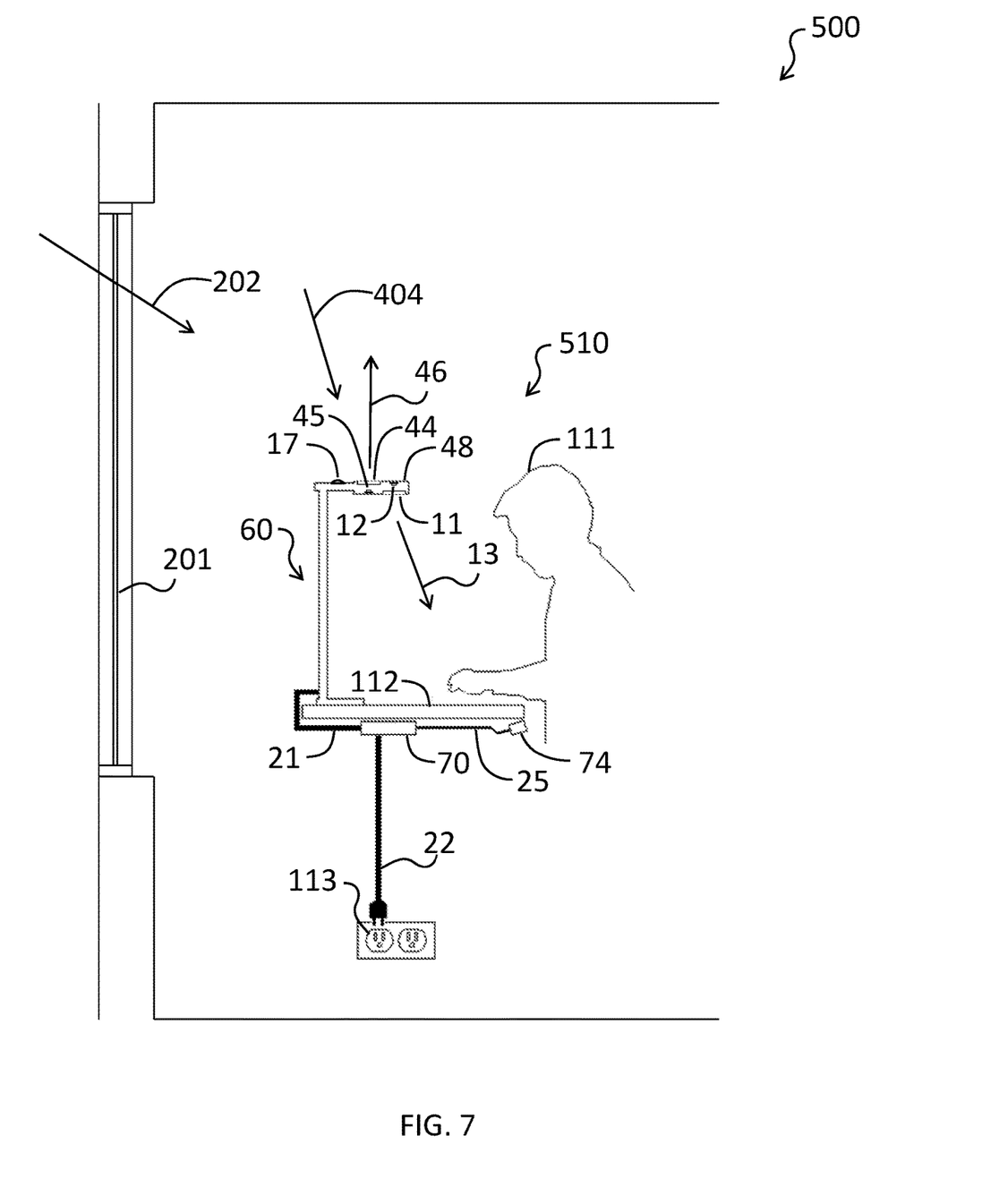
FIG. 7 is a diagram of an office comprising another exemplary embodiment of a luminaire of the invention.

Referring now to FIG. 7, in another preferred embodiment, where many of the items disclosed in office 400, workstation 410, and luminaire 40' of FIG. 5 are deployed in office 500, workstation 510, and luminaire 60 disposed therein, luminaire 60 further comprises control circuit 70 and operator interface 74, said control circuit 70 associated with tunable light sources 12 and 45 via control cable 21, associated with said operator interface 74 via interface cable 25, and powered via electrical cord and plug 22 associated with a power receptacle 113 of workstation 500. Specifically, control circuit 70 of luminaire 60 comprises a configurable, astronomical time processor capable of discerning and/or storing the geo-position of the luminaire based on user input or GPS thus allowing said control circuit to modulate the spectral distribution and/or color temperature of the task light 13 and/or ambient light 46 according to the local astronomical time of day and time of year.

In this preferred embodiment, control circuit 70 is disposed at the underside of work surface 112 of workstation 510, and operator interface 74 of luminaire 60 is disposed at work surface 112 in a position easily accessible to workstation occupant 111; however, it is also conceived that control circuit 70 and/or operator interface 74 may be disposed within or on luminaire body 48 along with tunable light sources 12 and 45. It is further conceived that any or all of control cable 21, cord and plug 22, communication cable 23, and/or interface cable 25 may be associated with controller 70 via one or more pluggable quick-connect/quick-disconnect port(s). Alternatively, it is also conceived that controller 70 may communicate wirelessly with operator interface 74.

In this preferred embodiment, operator interface 74 comprises one or more user interfaces (e.g. touch pads, pushbuttons, dials, sliders, and the like) that allow workstation occupant 111 to modulate and/or otherwise control intensity, color temperature and/or other aspects of ambient light 46 via interface cable 25, controller 70, control cable 21 and tunable light source 45 in addition to the user interfaces previously disclosed in FIGS. 1-6 and associated with operator interface 24.

Figure 8:
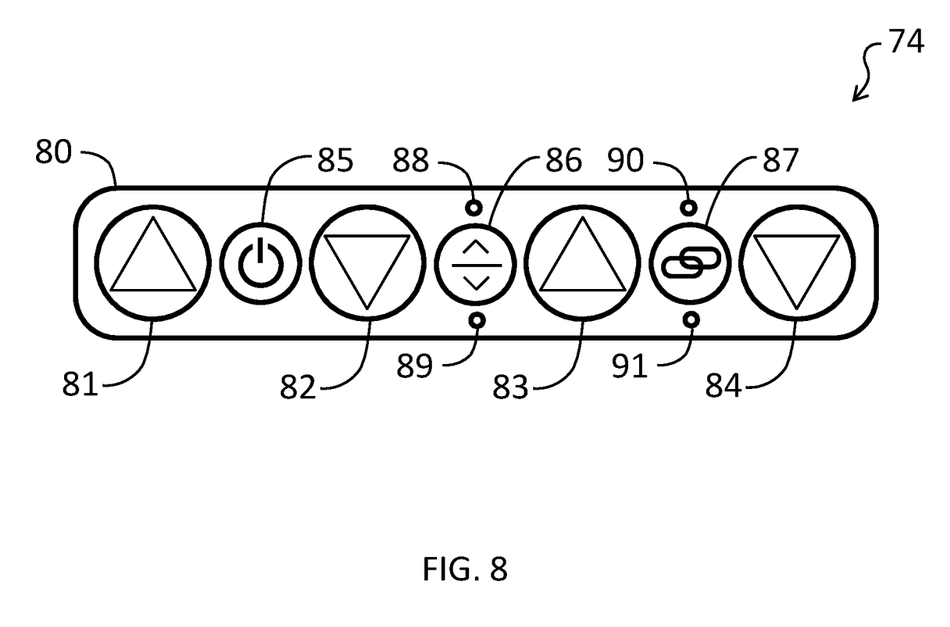
FIG. 8 is a frontal view of the user interface of the luminaire of the invention disclosed in FIG. 7.

Accordingly, FIG. 8 discloses a preferred user interface 74 comprising an interface housing 80, pushbuttons 81, 82, 83, 84, 85, 86 and 87, and indicator LEDs 88, 89, 90, and 91. Specifically, pushbutton 85 is configured along with control circuit 70 to switch tunable light sources 12 and 45 "on" and "off," and pushbutton 86 is configured with control circuit 70 to toggle the functionality of pushbuttons 81, 82, 83, 84, and 87 and indicator LEDs 8 and 89, collectively, between two control states, namely, an ambient light control state and a task light control state.

When said ambient light control state is activated, LED 88 is illuminated, LED 89 is not illuminated, push buttons 83 and 84 are configured along with control circuit 70 to respectively increase and decrease the color temperature of tunable light source 45, pushbuttons 81 and 82 are configured along with control circuit 70 to respectively increase and decrease the lumen output of tunable light source 45 at any given color temperature setting, and pushbutton 87 is configured along with control circuit 70 to activate and deactivate a first control program of control circuit 70, said first control program configured to desirably modulate the spectral distribution and/or color temperature of ambient light 46 according to the local astronomical time of day and time of year. Operator interface 74 is further configured along with control circuit 70 such that indicator LED 90 is illuminated when said first control program of control circuit 70 is active, and such that LED 90 is not illuminated when said first control program of control circuit 70 is not active.

Similarly, when said task light control state is activated, LED 89 is illuminated, LED 88 is not illuminated, push buttons 83 and 84 are configured along with control circuit 70 to respectively increase and decrease the color temperature of tunable light source 12, pushbuttons 81 and 82 are configured along with control circuit 70 to respectively increase and decrease the lumen output of tunable light source 12 at any given color temperature setting, and pushbutton 87 is configured along with control circuit 70 to activate and deactivate a second control program of control circuit 70, said control system configured to desirably modulate task lighting 13 in correlation to the color characteristics of ambient light 46. Operator interface 74 is further configured along with control circuit 70 such that indicator LED 91 is illuminated when said second control program of control circuit 70 is active, and such that LED 91 is not illuminated when said second control program of control circuit 70 is not active.

Notably, the luminaire of the invention disclosed in FIGS. 1 through 8 advantageously achieves desirable lighting color aspects for task lights operating in variable ambient lighting conditions via a user interface and control circuit that, in addition to allowing the user to modulate the color aspects of the task light, provides the user with the ability to activate a control program that automatically adjusts the color aspects of the task light according to an ambient light condition at said luminaire.

As described herein, the light sources 12, 45, and the sensor 17 are disposed in communication with the respective control circuit 20, 20', 70 by the control cable 21. In another embodiment, these luminaire elements 12, 45, and 17 may be configured to communicate wirelessly with one or more of the control circuit 20, 20', 70, the operator interface 24, and the controller 103. Wireless transceivers may be outfitted on each of the luminaire elements 12, 45, and 17 or a common transceiver may be disposed on the luminaire in communication with the luminaire elements 12, 45, and 17 in order to facilitate the wireless communication.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A luminaire for a workstation, comprising:
a tunable light source;
a control circuit in association with said luminaire configured to automatically modulate a spectral power distribution of said tunable light source in a response to a changeable ambient lighting condition; and
an operator interface in communication with said control circuit;
wherein said operator interface is configured to allow a workstation occupant to activate and deactivate said response without the workstation occupant changing the intensity of the tunable light source.

2. The luminaire of claim 1, wherein said control circuit is in communication with a controller of said ambient lighting condition.

3. The luminaire of claim 1, wherein said control circuit is in communication with an ambient light sensor of the luminaire.

4. The system of claim 1, wherein the workstation luminaire is a portable luminaire.

5. The luminaire of claim 1, wherein said luminaire is a task/ambient luminaire comprising at least two color tunable light sources.

6. The luminaire of claim 5, wherein said control circuit comprises a control program configured to modulate said changeable ambient lighting condition by modulating the spectral power distribution of at least one of said at least two color tunable light sources.

7. The luminaire of claim 1, wherein said operator interface and said control circuit are further configured to allow said workstation occupant to modulate the spectral power distribution of said at least one color tunable light source when said response is not active.

* * * * *